United States Patent [19]

Davis

[11] Patent Number: 5,449,993
[45] Date of Patent: Sep. 12, 1995

[54] REGENERATIVE AC TO DC CONVERTER

[75] Inventor: Rex M. Davis, East Leake, England

[73] Assignee: Switched Reluctance Drivers Limited, Leeds, United Kingdom

[21] Appl. No.: 255,698

[22] Filed: Jun. 7, 1994

[51] Int. Cl.⁶ .......................... H02P 3/14; H02P 6/00
[52] U.S. Cl. ................................ 318/701; 318/376; 363/37
[58] Field of Search ............... 318/701, 254, 138, 439, 318/696, 376; 363/34, 39

[56] References Cited

U.S. PATENT DOCUMENTS 3,769,564 10/1973 Rettig .
4,307,332 12/1981 Lorenzo et al. .

FOREIGN PATENT DOCUMENTS 2159672 12/1985 United Kingdom .

Primary Examiner—Bentsu Ro
Attorney, Agent, or Firm—Patterson & Keough

[57] ABSTRACT

A regenerative ac to dc convertor includes a thyristor bridge invertor and a rectifier having a dc link capacitor. A second capacitor is connected across the invertor. In a regenerative braking mode of the motor the invertor is arranged to return energy from the second capacitor to the ac supply. Circulating currents are inhibited by diodes connecting the dc link and second capacitor. A first diode is arrange to conduct from the positive terminal of the second capacitor to the positive terminal of the dc link capacitor. A second diode is arranged so that it conducts from the negative terminal of the dc link capacitor to the negative terminal of the second capacitor.

9 Claims, 2 Drawing Sheets

REGENERATIVE AC TO DC CONVERTER

This invention relates to regenerative ac to dc convertors for switched reluctance motors.

Switched reluctance (SR) machines connected for motoring and drawing power from an alternating current (ac) source of voltage, require a rectifier circuit. Typically, this is a single phase or multi-phase bridge rectifier circuit comprising an arrangement of diodes to create the rectified dc voltage. The dc voltage from the bridge rectifier is smoothed by a dc link capacitor across which the SR power convertor driving the motor windings is connected. The SR power convertor usefully includes active power semiconductor switches or other switching devices which sequentially connect and disconnect the rectified and smoothed dc voltage across the motor windings. Recirculating diodes are connected to either end of the windings to return winding currents, which are still present, when the switches are opened, to the dc link capacitor.

When the SR machine is operating as a motor, power flows from the ac source of voltage via the rectifier and SR power convertor to the SR motor windings. If, however, the SR machine is required to produce a braking torque, i.e. to act as a generator, power flows from the windings via the SR convertor, to the dc link capacitor. Since the diode rectifier does not permit power to be returned to the ac source of voltage, the generated power charges the dc link capacitor to a higher voltage. This imposes additional voltage stresses on the power conversion system. Only a limited amount of regenerated energy can be stored safely in the dc link capacitor.

If an SR machine is required to operate in a regenerative braking mode where the regenerated energy is greater than can safely be stored in the dc link capacitor, a known means of absorbing the regenerated power is to dissipate it in a dynamic braking resistor connected in parallel with the dc link capacitor by a semiconductor power switch. The semi conductor power switch is closed only when the dc link capacitor voltage exceeds a threshold value approximately equal to the peak value of the ac voltage source.

Another known means of absorbing the regenerated power is to interpose a thyristor bridge invertor circuit, including one or more inductors connected between its dc terminals and those of the dc link capacitor. The ac terminals are connected either directly or by a transformer to the ac voltage source. If no transformer is used, problems can arise associated with currents circulating between the terminals of the ac voltage source via one or more diodes of the rectifier and one or more thyristors of the invertor. If a transformer is used it represents a cost and weight disadvantage.

It is an object of the present invention to address the circulating current problems referred to above and to avoid the cost and weight penalties associated with the transformer.

According to the present invention there is provided a regenerative ac to dc convertor for a switched reluctance motor, the convertor comprising: a rectifier having an ac input for the or each phase of the ac supply and a dc output arranged to derive a uni-directional voltage from the ac input; a first capacitor, having a positive terminal and a negative terminal, which capacitor is connected across the dc output of the rectifier to smooth the direct voltage output; an invertor, having ac terminals connected with the ac input of the rectifier and dc terminals; a second capacitor also having a positive terminal and a negative terminal, which second capacitor is connected across the dc terminals of the invertor; and diode means by which both of the positive terminals and both of the negative terminals of the first and second capacitors are respectively connected together, such that the voltage across the second capacitor can only exceed the voltage across the first capacitor by an amount sufficient to cause the diode means to conduct.

The invention also extends to a control system for a switched reluctance motor having one or more motor windings and being operable in a motoring or regenerative braking mode, the control system including a regenerative ac to dc convertor for a switched reluctance motor, the convertor comprising: a rectifier having an ac input for the or each phase of the ac supply and a dc output arranged to derive a uni-directional voltage from the ac input; a first capacitor, having a positive terminal and a negative terminal, which capacitor is connected across the dc output of the rectifier to smooth the direct voltage output; an invertor, having ac terminals connected with the ac input of the rectifier and dc terminals; a second capacitor also having a positive terminal and a negative terminal, which second capacitor is connected across the dc terminals of the invertor; diode means by which both of the positive terminals and both of the negative terminals of the first and second capacitors are respectively connected together, such that the voltage across the second capacitor can only exceed the voltage across the first capacitor by an amount sufficient to cause the diode means to conduct; and switch means operable to control the current in the or each motor winding, the invertor being operable in the regenerative braking mode to inhibit circulating currents by drawing current from the second capacitor and partially discharging it until the diode means become non-conducting and being further operable to maintain the voltage across the second capacitor at a level at which the diode means remain non-conducting in the regenerative braking mode.

Thus, according to the invention, the problems associated with circulating currents in previously known regenerative convertors are inhibited by the use of the second capacitor across the invertor and by a pair of diodes between that capacitor and the dc link capacitor.

The invention can be put into practice in various ways, one of which will now be described by way of example with reference to the accompanying drawings in which.

Figure 1:
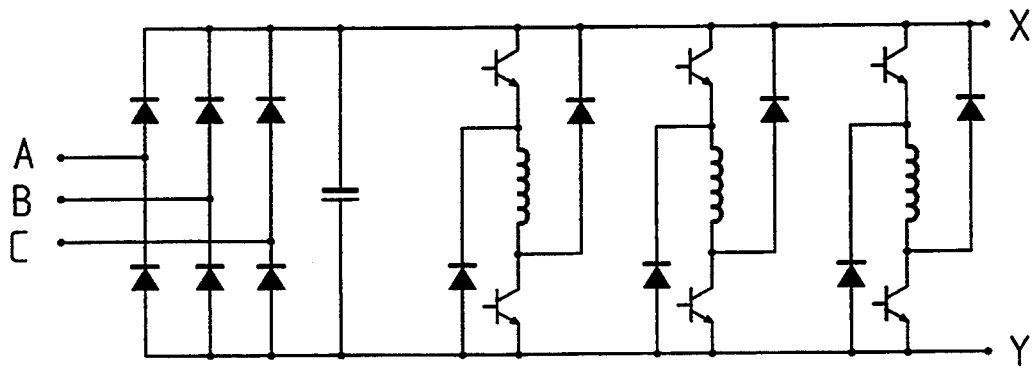
FIG. 1 is a known switched reluctance motor convertor control circuit.
Figure 2:
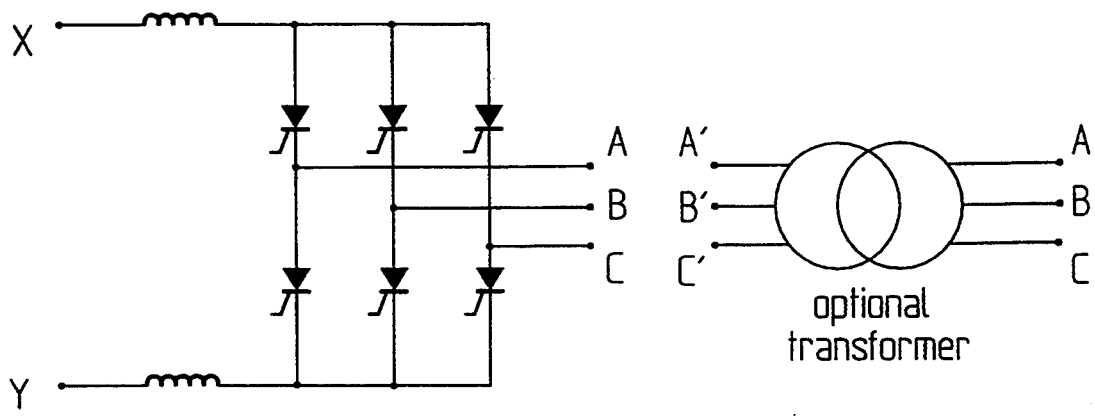
FIG. 2 is a known thyristor invertor for the control circuit of FIG. 1.

FIG. 1 shows a non-regenerative convertor for a three-phase SR motor drawing power from a three-phase ac voltage source. FIG. 2 shows a thyristor bridge which can be added to a non-regenerative convertor to enable regeneration. The combination of the circuits of FIGS. 1 and 2 experiences the recirculating current problems (referred to above) between the diode rectifier and the thyristor invertor. These problems arise if the terminals X Y of FIG. 2 are connected to the terminals X Y of FIG. 1 and the terminals A B C of the invertor of FIG. 2 are connected with the terminals A B C of FIG. 1. The transformer of FIG. 2 can optionally be connected between the thyristor invertor and the ac source of voltage to address these problems as will be apparent to the skilled person. The terminals X Y of FIG. 2 are connected with the terminals X Y of FIG. 1, and the terminals A B C of the invertor of FIG. 2 are connected to terminals A' B' C' of the transformer whose output terminals A B C are connected with the terminals A B C of the convertor of FIG. 1.

Figure 3:
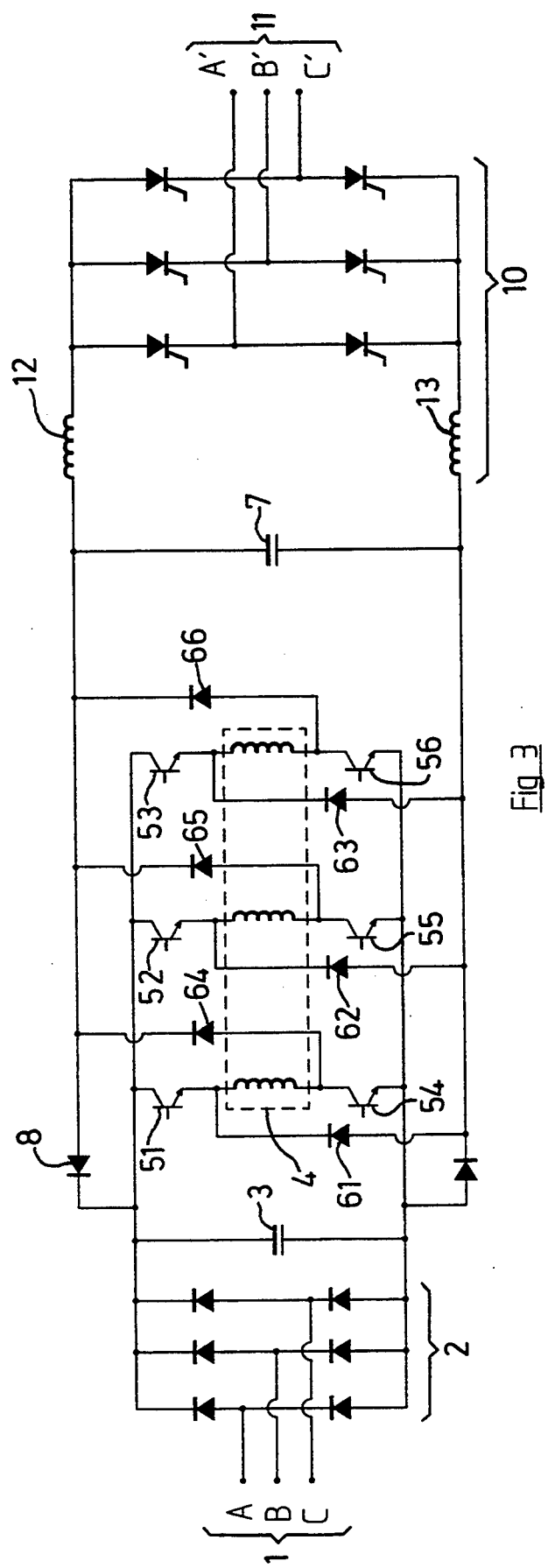
FIG. 3 is a regenerative convertor according to the invention.

In FIG. 3, a regenerative three-phase convertor for an SR motor, drawing power from a three-phase ac source of voltage returns regenerative power to the ac source of voltage via the thyristor invertor.

The three-phases of the ac source of voltage 1 are respectively connected to the ac inputs of a bridge rectifier 2 and to the ac terminals of a thyristor invertor 10 either directly or through reactors connected between A and A', B and B' and C and C'. The three-phase rectifier 2 comprises six diodes in the conventional three phase bridge configuration with ac terminals A B C. A dc link capacitor 3 is connected across the dc terminals of the rectifier 2. The dc link capacitor 3 smooths the rectified output from the rectifier 2. The diodes are connected to conduct towards a positive side of the dc link capacitor 3.

Each of the three SR motor windings 4 is connected between the positive and negative terminals of the dc link capacitor 3 through first and second power transistor switches 51/54, 52/55 and 53/56 in a conventional manner. A first recirculating diode 64/65/66 is connected to conduct from the negative terminal of each winding to the positive side of the dc link capacitor through a regenerative diode 8. A second recirculating diode 61/62/63 is connected with the negative side of the dc link capacitor 3 through a second regenerative diode 9, and conducts towards the positive terminal of each respective motor winding.

A regenerative capacitor 7 is connected across the first and second recirculating diodes and is arranged to receive energy from the recirculating diodes 61 to 66. The voltage across the regenerative capacitor 7 can only exceed that of the dc link capacitor 3 by the voltage drop across the regenerative diodes 8 and 9.

The invertor 10 is a conventional thyristor bridge which is connected, via inductors 12 and 13, across the regenerative capacitor 7. The inductors are windings mounted on the same or separate cores. They provide for instantaneous differences in potential between the regenerative capacitor 7 and the ac connections A' B' or B'C' or C'A', depending on which thyristors of the invertor bridge 10 are conducting.

When the SR machine is running as a motor, the two regenerative diodes conduct which effectively connect in parallel the dc link capacitor and the regenerative capacitor. The invertor is inhibited and inoperative during motoring conditions.

When regenerative operation is required the invertor is activated, drawing current from the charged regenerative capacitor, partially discharging it until the two regenerative diodes become non-conducting and thus removing the opportunity for circulating currents to flow. The invertor is then operated according to conventional techniques to maintain the voltage across the regenerative capacitor at a value which avoids conduction of the said two diodes, while returning regenerative power via the regenerative capacitor and the invertor to the ac source of voltage.

Thyristor firing circuits and control circuits for the invertor bridge 10 are known in the art for, in this case, controlling the voltage across the regenerative capacitor 7 at a value which prevents conduction of the regenerative diodes 8 and 9 while inversion is in progress during regenerative braking and responds to a call for regeneration.

A call for regeneration can arise in two ways:
(1) The control signal demanding motor speed is reduced by an amount which requires regeneration in order for the motor to respond to the demanded speed reduction.
(2) The system to which the motor shaft is connected causes the motor speed to increase to a value exceeding that corresponding to the demanded motor speed.

In either case a signal within the control electronics representing speed error will indicate excess speed, and this signal is used to activate the invertor. When the speed error indicates that the motor speed is either correct or too low, the invertor is inhibited by removal of all the thyristor gate firing signals.

The operation of the thyristor invertor is the same as for any other application requiring the conversion of direct voltage power and its return to an existing ac supply system, and as such is well known to those skilled in the art.

When regeneration is not required, i.e. when the motor is motoring, the firing control circuit for the invertor 10 deactivates the invertor.

What is claimed is:

1. A regenerative ac to dc convertor for a switched reluctance motor, the convertor comprising: a rectifier having an ac input and a dc output arranged to derive a uni-directional voltage from the ac input; a first capacitor, having a positive terminal and a negative terminal, which capacitor is connected across the dc output of the rectifier to smooth the direct voltage output; an invertor, having ac terminals connected with the ac input of the rectifier and dc terminals; a second capacitor also having a positive terminal and a negative terminal, which second capacitor is connected across the dc terminals of the invertor; and diode means by which both of the positive terminals and both of the negative terminals of the first and second capacitors are respectively connected together, such that a voltage across the second capacitor can only exceed a voltage across the first capacitor by an amount sufficient to cause the diode means to conduct.

2. A convertor as claimed in claim 1 in which the diode means comprise a first diode, connected to conduct from the positive terminal of the second capacitor to the positive terminal of the first capacitor, and a second diode, connected to conduct from the negative terminal of the first capacitor to the negative terminal of the second capacitor.

3. A convertor as claimed in claim 1, including inductance means by which the dc terminals of the invertor are connected across the second capacitor.

4. A convertor as claimed in claim 3 in which the inductance means comprise first and second inductors each of which is respectively connected between the positive and negative terminals of the second capacitor and each of the dc terminals of the invertor.

5. A convertor as claimed in claim 3 in which the invertor is a three-phase thyristor bridge, having two thyristors per phase serially connected with the inductance means across the second capacitor.

6. A convertor as claimed in claim 1 in which the invertor consists of a thyristor bridge.

7. A convertor as claimed in claim 1 in which the rectifier is a bridge rectifier.

8. A convertor as claimed in claim 7 in which the rectifier is a three-phase bridge, having two serially connected diodes per phase.

9. A control system for a switched reluctance motor having one or more motor windings and being operable in a motoring or regenerative braking mode, the control system including a regenerative ac to dc convertor for a switched reluctance motor, the convertor comprising: a rectifier having an ac input for the or each phase of the ac supply and a dc output arranged to derive a unidirectional voltage from the ac input; a first capacitor, having a positive terminal and a negative terminal, which capacitor is connected across the dc output of the rectifier to smooth the direct voltage output; an invertor, having ac terminals connected with the ac input of the rectifier and dc terminals; a second capacitor also having a positive terminal and a negative terminal, which second capacitor is connected across the dc terminals of the invertor; diode means by which both of the positive terminals and both of the negative terminals of the first and second capacitors are respectively connected together, such that a voltage across the second capacitor can only exceed a voltage across the first capacitor by an amount sufficient to cause the diode means to conduct; and switch means operable to control the current in the or each motor winding, the invertor being operable in the regenerative braking mode to inhibit circulating currents by drawing current from the second capacitor and partially discharging it until the diode means become non-conducting and being further operable to maintain the voltage across the second capacitor at a level at which the diode means remain non-conducting in the regenerative braking mode.

* * * * *

UNITED STATES PATENT AND TRADEMARK OFFICE
CERTIFICATE OF CORRECTION

PATENT NO. : 5,449,993
DATED : September 12, 1995
INVENTOR(S) : Rex M. Davis

It is certified that error appears in the above-indentified patent and that said Letters Patent is hereby corrected as shown below:

On the title page, item [73]:

In the name of the Assignee, please change "Drivers" to "Drives".

In the Abstract, line 8, please change the word "arrange" to -- arranged--.

Signed and Sealed this

Twenty-sixth Day of December, 1995

Attest:

BRUCE LEHMAN

*Attesting Officer*        *Commissioner of Patents and Trademarks*